United States Patent [19]

Duke

[11] 4,363,508

[45] Dec. 14, 1982

[54] ANIMAL WASTE COLLECTION APPARATUS

[76] Inventor: Jesse C. Duke, 2773 The Fontainebleau, Atlanta, Ga. 30331

[21] Appl. No.: 237,886

[22] Filed: Feb. 25, 1981

[51] Int. Cl.³ ............................................. A01K 29/00
[52] U.S. Cl. ................................................ 294/1 BB
[58] Field of Search ................. 294/1 B, 1 BA, 1 BB, 294/19 R, 50.9, 53.5, 55; 15/104.8, 257.1, 257.4, 257.6, 257.7; 248/95, 99–101

[56] References Cited

U.S. PATENT DOCUMENTS

| | | | |
|---|---|---|---|
| 3,677,596 | 7/1972 | Yonaites et al. | 294/1 BA |
| 3,786,780 | 1/1974 | Pezzino | 294/1 BB |
| 4,010,970 | 3/1977 | Campbell | 294/1 BB |
| 4,021,994 | 5/1977 | Mainprice | 294/1 BA |
| 4,103,953 | 8/1978 | Lachance | 294/1 BA |
| 4,185,861 | 1/1980 | Berner | 294/1 BB |

Primary Examiner—Johnny D. Cherry
Attorney, Agent, or Firm—Jones & Askew

[57] ABSTRACT

An animal waste collection apparatus to collect and dispose of solid waste evacuated from an animal. The apparatus includes a handle to which is attached a frame, disposable waste containment bag and pivoting support arms which drop downwards upon release. The support arms are held in a horizontal receiving position by a latching device, which may be released by a remote manual release mechanism, which when activated allows the support arms to drop downward away from the frame by force of gravity. The waste containment bags are sleeved to fit over the support arms and are clamped between the support arms and frame when the support arms are in the receiving position. When the support arms are released, the waste containment bags slide from the support arms, which are pointed slightly inward to prevent the bag from binding.

10 Claims, 9 Drawing Figures

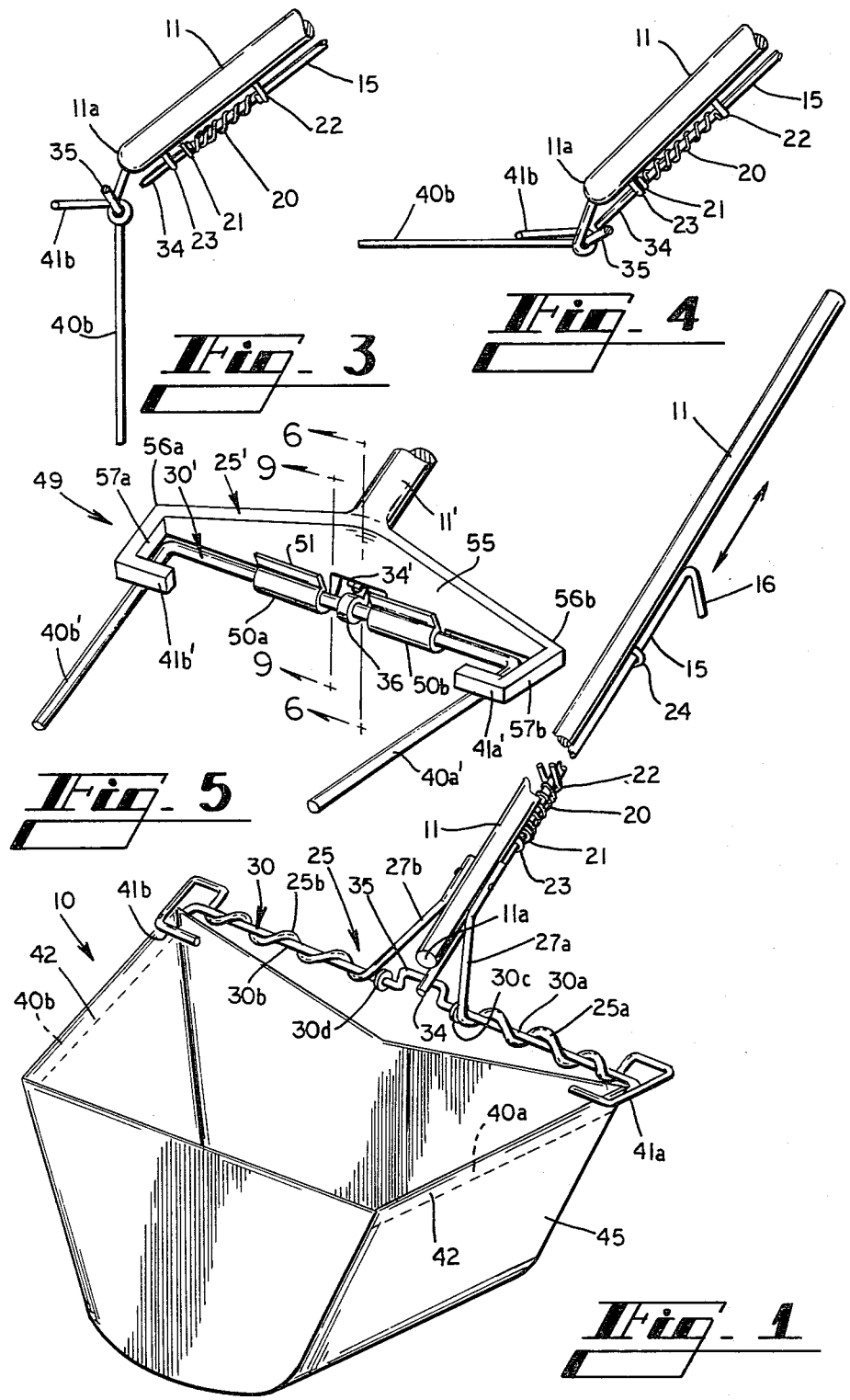

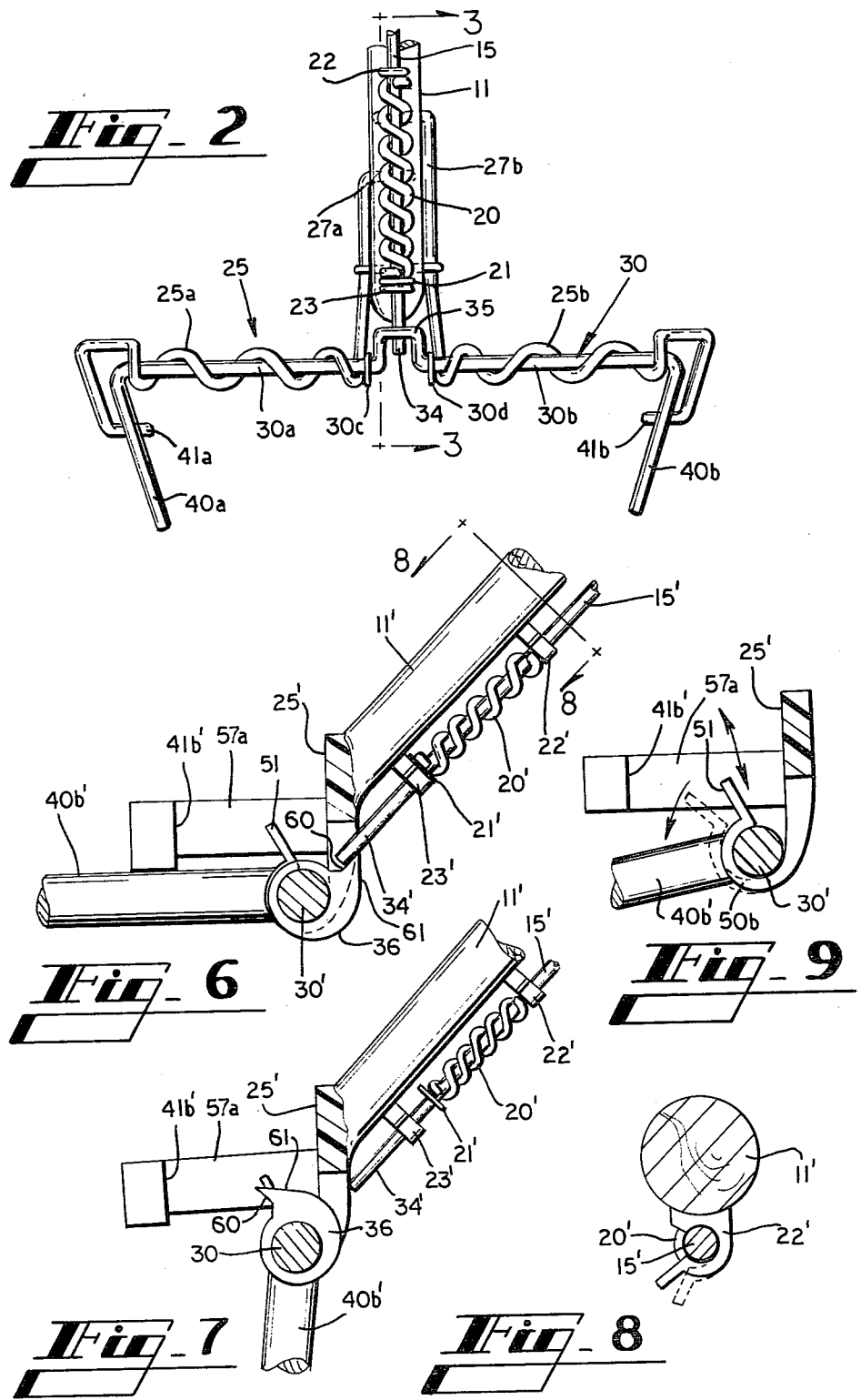

ANIMAL WASTE COLLECTION APPARATUS

BACKGROUND

1. Field of the Invention

This invention relates in general to apparatus for sanitary collection of animal waste, and relates in particular to apparatus for receiving and disposing of animal feces.

2. Description of Prior Art

The prior art discloses numerous devices for receiving and collecting pet animal fecal matter. These devices have been frequently introduced in response to ordinances imposed by municipal governments which require that pet owners be responsible for unsanitary wastes left by pets on city streets. While many of these devices are suitable for receiving or collecting animal excrement, a problem commonly encountered with such devices is that they are either complex and expensive to fabricate, or they force the pet owner to come into uncomfortably close proximity to the waste containment means in order to dispose of the waste. The prior art does not disclose a device which is simultaneously simple and inexpensive to fabricate, and allows the pet owner to remain a comfortable distance from the animal's excrement.

For example, Skermetta, U.S. Pat. No. 4,042,269, discloses a complex and cumbersome device which allows remote discard of the waste. Campbell, U.S. Pat. No. 4,010,970, merely discloses remote partial sealing of a waste containment bag without any means for remote discard. Remote disposal is disclosed in Lachance, U.S. Pat. No. 4,103,953, but the device there contains a slidable coiled spring wrapped around the handle which is heavy and expensive to fabricate; moreover, the containment bag tends to migrate off the end of the support arm during transport.

SUMMARY OF THE INVENTION

The present invention allows the pet owner to maintain a comfortable distance from the discharging animal and its unsanitary matter while at the same time allowing remote disposal of such matter in a convenient location. By receiving the excrement in a containment bag at the end of an extended handle and by allowing the matter in its containment bag to drop from the end of the device by the force of gravity upon release, the invention provides a convenient means whereby the pet owner can discard of the unwanted material without being exposed to the unpleasant sight or odor.

The device is simple and inexpensive and can be made readily available to many pet owners. The primary advantage of the invention is to give the pet owner an extended reach to catch or receive deposited matter from a distance while allowing convenient disposal.

Stated in general terms, the present invention holds a disposable containment bag in position to receive feces being evacuated from an animal, and thereafter operates to reject the containment bag at a suitable location. Stated somewhat more specifically, the invention includes a pair of support arms releasably attached to a handle. These support arms can be placed in a horizontal "receive" position which clamps a disposable containment bag between the support arms and the frame. The operator can release the support arms from this "receive" position by manipulating a release member; the arms then drop to a downward "dispose" position which allows the disposable bag to slide from the arms.

The disposable containment bag, being sleeved, is placed over support arms which hold the bag in an open position. When the support arms are latched into the "receive" position, the handle is then held to dispose the open bag in an upright open position underneath the pet as it begins its natural function. When the pet has satisfied its desires, the owner can hold the filled bag at a comfortable distance by the handle while travelling to a convenient disposal place. Once this disposal place is reached, the operator simply holds the filled bag over the disposal area and activates the release mechanism which allows the support arms to drop downwardly and the filled bag to fall off.

A clear advantage of the present device is that there is no discomfort caused by the sight or odor of the animal deposits since such deposits are contained entirely within the bag and held at a distance and can be remotely and quickly removed with a simple action. Accordingly, it is an object of this invention to provide an improved animal waste collection apparatus.

Another object of the present invention to provide a simple, inexpensive-to-manufacture, and lightweight animal waste collection apparatus which can be used for remote collection, transport, and disposal of animal feces.

BRIEF DESCRIPTION OF THE DRAWINGS

FIG. 1 is a pictorial view of an embodiment of an animal waste collection apparatus according to the present invention.

FIG. 2 is a bottom plan view of the frame portion of the apparatus shown in FIG. 1.

FIG. 3 is a partial side view of the apparatus of FIG. 1 showing the bag support arms in the downward, released position.

FIG. 4 is a partial side view of the apparatus of FIG. 1 showing the support arms latched in the upper position for securing a containment bag.

FIG. 5 is a pictorial partial view of another embodiment of the invention.

FIG. 6 is a section view taken along line 6—6 of FIG. 5 showing the bag support arms in the latched position.

FIG. 7 is a section view taken along line 6—6 of FIG. 5, with the release mechanism disengaged and the bag support arms in the downward position.

FIG. 8 is a section view taken along line 8—8 of FIG. 6.

FIG. 9 is a section view taken along line 9—9 of FIG. 5, illustrating the manner in which components of the frame portion are assembled.

DESCRIPTION OF THE PREFERRED EMBODIMENTS

In the embodiment shown generally at 10 in FIG. 1, the device has a handle 11 having a lower end 11a. A release rod 15 is attached to the underside of the handle 11, and the upper end of the release rod is bent downwardly to form an operating member 16. Rings 22, 23, and 24 secured to the handle 11 support the release rod 15, and the release rod is slidably movable within the rings.

Along the lower end of the release rod 15 is disposed a compression spring 20, which is shown more clearly in FIGS. 3 and 4. The spring 20 is compressed between a washer 21 or the like affixed to the release rod 15, and the support ring 22 located a short distance upwardly from the washer. The lower ring 23 also defines the lower limit of release rod movement in response to the spring 20, as seen in FIG. 4. The spring 20 urges the release rod 15 back to a latched position after activation by the operating member 16.

To the bottom of the handle 11 is attached a horizontal frame 25 which, in this embodiment, consists of stiff heavy-gauge wire coils 25a and 25b extending perpendicularly from a point below to the lower end 11a of the handle 11 and coiled in a fashion so as to form part of a hinge which rotatably contains a hinge member 30. One end of each coil 25a and 25b has an elongated extension 27a, 27b which extends back to lie alongside the lower end of the handle 11. These extensions 27a and 27b are secured to the handle 11 by any suitable means, so as to attach the frame 25 to the handle.

The hinge member 30 includes straight parallel portions 30a and 30b which are pivotably retained within the hinge formed by the coils 25a and 25b. Bag support arms 40a and 40b are affixed at an acute angle to the outer ends of the hinge member 30a and 30b. A detent 35 is formed at the midpoint of the hinge member 30, and a pair of blocking members such as washers 30c and 30d are secured to the hinge member alongside the detent to keep the hinge member and the support arms 40a, 40b centered relative to the handle 11. The detent is engaged by the lower end 34 of the release rod 15, so as to latch the hinge member in a fixed rotational position, as shown in FIGS. 1, 2 and 4. The hinge member 30, bag support arms 40a and 40b, and detent 35 are unitary and formed of bent, heavy-gauge wire rod.

The outer ends of each coil 25a and 25b terminate in front of the respective coils to provide fingers 41a, 41b disposed above the respective support arms 40a and 40b. The fingers 41a and 41b are aligned to be engaged and resiliently displaced upwardly by the support arms 40a and 40b when the detent is latched to keep the support arms in the horizontal position, FIG. 4, and the fingers thus impart a downwardly-directed movement to the support arms when the latch is released. The fingers 41a, 41b and the latched hinge member 30 thus firmly hold bag support arms 40a and 40b in the horizontal "receive" position for receiving waste. When the bag support arms are held in this upper, latched position as best shown in FIGS. 1 and 4, a disposable bag 45 is grasped firmly between the support arms and the fingers 41a, 41b at the outer ends of the frame 25.

The disposable bag 45 is formed of a lightweight disposable material such as plastic and has sleeves 42 of a sufficient diameter to slidably receive the support arms 40a and 40b along opposite sides of the open end of the bag. The bag is held open by the support arms and protects them from contact with the feces. As thus held open, the bag is immobilized by being clamped between fingers 41a, 41b and the bag support arms 40a and 40b.

Referring now to FIG. 2, the support arms 40a and 40b can be seen to be held against the fingers 41a, 41b of the hinge member 30. The lower end 34 of the release rod 15 is shown engaging the hinge member 30 at the detent 35 to latch the hinge member and prevent movement of the support arms.

FIG. 3 shows the device of FIG. 1 in the "release" position, with the release rod 15 retracted by the operator, compressing the spring 20 between the affixed washer 21 and the ring 22, thereby allowing the lower end 34 of the release rod 15 to disengage detent 35. Thus, the hinge member 35 is allowed to rotate and the support arms 40a, 40b can then fall to the dwonward position by the force of gravity, assisted by the resilient urging of the fingers 41a and 41b. The acute mounting angle of each support arm prevents the bag 45 from frictionally clinging to the vertical support arms. The disposable bag 45 (not shown in FIG. 3) then easily slips off the support arms by its own weight.

FIG. 4 shows the device of FIG. 1 with the support arms 40a, 40b in the latched "receive" position and held firmly in place by the lower end 34 of the release rod 15. It is in this latched position that the disposable bag 45 will be firmly grasped between the support arms 40a, 40b and fingers 41a and 41b.

FIG. 5 portrays another embodiment of the present invention. The upper portion of handle 11' is omitted from this embodiment but can be separately attached to the frame 25', or could easily be formed by molding from a resilient material concurrently along with the frame 25' which is shown in this embodiment as a one-piece frame molded of a plastic material such as polypropylene or the like. Also omitted is the release rod 15', which is and operates essentially the same as the rod 15 in FIG. 1. Frame 25' contains two cylindrical resilient sleeves 50a, 50b which have a flanged opening 51 opposite the line of attachment to the frame 25'. These cylindrical sleeves receive and support firmly but rotatably the hinge member 30'.

The frame 25' includes a solid body 55 extending transversely of the handle 11' lower end, and terminating at outer ends 56a, 56b extending just beyond the longitudinal ends of the hinge member 30'. Projections 57a and 57b extend forwardly a short distance from the outer ends 56a and 56b, and fingers 41a' and 41b' extend inwardly from the projections to overlie the support arms 40a', 40b' and resiliently engage the support arms when latched in the horizontal position shown in FIG. 5. The body 25', projections 57a and 57b, and fingers 41a' and 41b' are molded as a unitary member in the disclosed embodiment.

The hinge member 30' includes a cam 36 formed at the midpoint of the hinge member, and the cam provides the functional equivalent of the detent 35 in the first-described embodiment. The cam 36 is best seen in FIGS. 6 and 7, and has a locking ledge 60 which engages the lower end 34' of the release rod 15'. A curved cam surface 61 extends up to the locking ledge 60 from the underside of the cam 36, and it will be understood that the lower end 34' of the release rod rides along the cam surface and then engages the locking ledge 60 as the hinge member 30' and cam 36 are returned from the "release" position (FIG. 7) to the "receive" position (FIG. 6). The hinge member 30' and the cam 36, together with the support arms 40a', 40b' may be integrally molded from a suitable plastic material. Alternately, the cam 36 can be separately formed and secured to the hinge member 30'.

Each of the cylindrical sleeves 50a and 50b in integrally formed with the frame 25', curling forwardly and upwardly from the underside of the frame to receive the hinge member 30'. The sleeves are preferably sufficiently resilient to be manually deformed as shown in FIG. 9, to allow the hinge member 30' to be inserted. A tab 51 is formed at the outer end of each receptacle 50a and 50b for that purpose.

The release rod 15' may, in similar manner, be slidably supported in support rings including the rings 22' and 23' integral with the handle 11'. A typical support ring 22' is shown in FIG. 8, with the manually-deformed position to receive the release rod 15' shown in broken line. The bag support frame 25' is shown in the latched "receive" position in FIG. 6, with the lower end of the release rod 15' engaged with the cam 36 so as to hold the hinge member 30' and the attached support arms 40a', 40b' firmly against the fingers 41a' and 41b' of the frame 25'. It is in this latched position that the disposable bag 45 is firmly grasped between the frame 25' and the support arms in a fashion similar to that employed in the preceding embodiment.

In FIG. 7, the release rod 15' has been activated by the operator, thereby compressing the spring 20' between support ring 22' and washer 21' which is immovably attached to the release rod 15' as in the preceding embodiment, allowing the cam 36 to disengage the lower end 34' of release rod 15'. Hinge member 30' is thus free to rotate and the support arms 40a', 40b' are allowed to rotate and fall downward. The force of the spring 20' will cause the lower end 34' of the release rod 15' to re-engage the cam 36 when the support arms 40a', 40b' are returned upward to the latched position.

To use either of the above-described embodiments the operator releases the release rod 15 so as to allow the support arms to become free. The operator then slides the disposable bag 45 over the support arms through the sleeves in the bag. The support arms then are moved upward towards the frame 25 until the spring-loaded release rod 15 re-engages the cam or detent, as the case may be, which then securely holds the support arms and the bag contained thereon firmly in the grasp of the support arms and the fingers. The device is now ready for use by the operator, who places the open bag beneath the defecating animal.

It is to be noted that the device requires no cleaning or maintenance in that the disposable bag is the only part to come into contact with the animal droppings. The operator can hold the filled bag and its contents at a comfortable distance by the handle 11 while transporting it to a suitable disposal area, at which time the operator simply activates the release rod, allowing the support arms to drop downward and the filled bag to fall of its own accord from the support arms.

From the foregoing detailed description of the preferred embodiments, it will be appreciated that these embodiments accomplish the above-noted objectives of the present invention. It will be understood by those skilled in the art that other embodiments of the present invention will readily suggest themselves and therefore the scope of the present invention is to be limited only by the claims below.

What is claimed is:

1. An animal waste collection apparatus comprising:
   a handle with an upper part and a lower part, said upper part to be held by the operator of the apparatus;
   a frame connected to said lower part of said handle;
   hinge means pivotably connected to said frame;
   a plurality of supporting arms attached to said hinge means and extending outwardly therefrom, said supporting arms being capable of assuming either a first position or a depending second position;
   removable disposable waste containment means slidably receivable on said supporting arms and including a portion to be retained between said supporting arms and said frame when said supporting arms assume said first position;
   release means operatively engaging and retaining said hinge means when said supporting arms are in said first position; and
   activation means selectably operative to release said release means from engagement with said hinge means, thereby allowing said hinge means to pivot, said supporting arms to drop downwardly to said second depending position, and said waste containment means to be removed from said supporting arms.

2. The animal waste collection apparatus of claim 1, further comprising means for urging said release means back into engagement with said hinge means when said supporting arms are returned from said second depending position to said first position.

3. The animal waste collection apparatus of claim 2 wherein said frame comprises metal wire attached at one end to said handle and coiled about said rotatably containing said hinge means.

4. The animal waste collection apparatus of claim 2, wherein said handle has a plurality of attachment means for slidably receiving and holding said activation means, and said urging means comprises a coiled spring having an upper end and a lower end and spiralled about said activation means, one end of said spring being affixed to said activation means so as to compress said spring against at least one of said attachment means when said activation means is operated by the operator of said apparatus, thereby operating to urge said activation means and said release means to return to engagement with said hinge means.

5. The animal waste collection apparatus of claim 1, wherein:
   said hinge means comprises a shaft carrying said support arms; and
   said release means comprises a cam affixed to said shaft and selectably engaged by said release means.

6. The animal waste collection apparatus of claim 5, wherein said activation means comprises an elongated rod having an upper part and a lower part slidably attached to said handle,
   said upper part including operating means to be manipulated by the operator of said apparatus; and
   said lower part being operative to engage said cam so as to retain said hinge means in said first position.

7. The animal waste collection apparatus of claim 1, wherein a plurality of sleeves of resilient material are longitudinally and horizontally attached to said frame, said sleeves being discontinuous opposite the line of attachment to said frame so as to rotatably receive and hold said hinge means.

8. The animal waste collection apparatus of claim 1, wherein each of said supporting arms form an acute angle with respect to said hinge means, thereby permitting said waste containment means to be unbindingly removable from said support arms when said support arms assume said second depending position.

9. An animal waste collection apparatus to hold a waste containment receptacle in position to receive waste evacuated from an animal, comprising:
   means defining a frame;
   receptacle support means supported by said frame for pivotable movement between a first position and a second position relative to said frame;
   said receptacle support means having a pair of receptacle holding members for supporting a waste containment receptacle;
   means on said frame operative to retain said receptacle support means in said first position, and selectably operable to release said receptacle support means for pivotable movement to said second position;

means operative to engage at least one of said receptacle holding members and a waste containment receptacle held thereon, in said first position, so as to prevent inadvertent dislodgement of the waste containment receptacle; and said engaging means operating to release the waste containment receptacle when said receptacle support means is released for movement to said second position, so that the receptacle is freely and gravitationally removable from said receptacle holding members in said second position.

10. The animal waste collection apparatus of claim 9, wherein:

said means which engage said receptacle holding members in said first position is operative to urge said receptacle holding members towards said second position;

thereby assisting the movement of said holding members from said first position to said second position whenever said engaging means is released.

* * * * *